US 6,717,294 B2

(12) United States Patent
Chuo

(10) Patent No.: US 6,717,294 B2
(45) Date of Patent: Apr. 6, 2004

(54) HIGH SPEED LINEAR MOTOR WITH A PRECISE POSITIONING ABILITY

(75) Inventor: Yung-Tsai Chuo, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 10/161,729

(22) Filed: Jun. 5, 2002

(65) Prior Publication Data

US 2002/0180281 A1 Dec. 5, 2002

(30) Foreign Application Priority Data

Jun. 5, 2001 (TW) .................................. 90209438 U

(51) Int. Cl.⁷ ............................................... H02K 41/00
(52) U.S. Cl. ........................................................ 310/12
(58) Field of Search ............................... 310/12, 13, 14; 318/135

(56) References Cited

U.S. PATENT DOCUMENTS

| 4,359,289 | A | * | 11/1982 | Barrus et al. | 400/322 |
| 4,837,467 | A | * | 6/1989 | Newman | 310/12 |
| 4,869,626 | A | * | 9/1989 | Kosmowski | 408/129 |
| 5,661,350 | A | * | 8/1997 | Lucidarme et al. | 310/12 |
| 6,107,703 | A | * | 8/2000 | Korenaga | 310/12 |
| 6,437,463 | B1 | * | 8/2002 | Hazelton et al. | 310/12 |
| 6,445,093 | B1 | * | 9/2002 | Binnard | 310/12 |

* cited by examiner

Primary Examiner—Burton S. Mullins
Assistant Examiner—Judson H. Jones
(74) Attorney, Agent, or Firm—Rosenberg, Klein & Lee

(57) ABSTRACT

The high-speed linear motor disclosed herein comprises a stationary part and a moving part. The stationary part is composed of conjoined upper and lower primary structures. Each primary structure consists of at least two field magnet modules. The moving secondary part then lies between the two primary structures by a non-wearing bearing so that it can move with high efficiency and no friction loss. A position sensor is provided for precisely positioning a work piece and there is no worry about interruption of feed back signal because there is no wire connection at the moving part.

5 Claims, 4 Drawing Sheets

HIGH SPEED LINEAR MOTOR WITH A PRECISE POSITIONING ABILITY

BACKGROUND OF THE INVENTION

1. Field of the Invention

The present invention relates to a high speed linear motor with a precise positioning ability, more particularly, a high speed linear motor having a precise positioning ability characterized in that the motor's primary side is stationary and the motor's secondary is moving at high speed.

2. Descriptions of the Prior Art

Machinery operating at high speed and efficiency is widely used in miscellaneous industrial applications such as a wafer carrier, a high-speed wafer probe, etc. There are two major categories of high-speed linear motion machinery, namely, a ball screw driven by a rotary motor and a linear motor. A ball screw converts a rotary motor's rotation into linear motion, while a linear motor is a direct drive mechanism.

In a conventional machine, a ball screw is fixed in position by bearings and coupled to a rotary motor. As the ball screw rotates with the motor, its nut is driven to make linear movements. However, the problems of insufficient stiffness of the ball screw shaft and backlash existing between contacting parts result in the positioning error of a work piece. Furthermore, slippery motion between contact surface of the ball screw and the bearings brings about a frictional resistance that retards the moving speed (about 60 m/min) and the acceleration (usually below 1 G), and generates heat loss as well. In addition, an uneven frictional abrasion between the moving and the stationary parts of the ball screw assembly further affects machine's positioning ability. Consequently, the durability of the machine is greatly reduced, and so is its lifetime. Besides, a conventional machine operating as such has been notorious for its awkwardness in appearance and bulkiness in size, which results in taking up more space for installation in a plant.

In a linear motor direct drive machine, the linear motor has a stationary part formed of a serrated structure with a ferromagnetic substance, and a moving part formed of an electromagnet and possibly a permanent magnet as well. The moving part moves relative to the stationary part. In a linear motor, its primary side may be an electromagnet whose magnetic field is built up by a current flowing through its winding thereof, while the secondary side is a serrated structure formed of the ferromagnetic substance. In such a structure, it is surely no problem when the linear motor operates at low speed, but in case it operates at high speed, the connection joints in the moving part are easily broken when the moving part reciprocates rapidly thereby shortening the motor's lifetime. In order to prevent such a fault, the aforementioned joint portions shall be checked from time to time or even replaced in a predetermined period, thereby, incurring great inconvenience to users.

In view of the foregoing situation, the inventor of this invention herein conducted intensive research based on many years' experience gained through professional engagement in the manufacturing of related products, with continuous experimentation and improvement culminating in the development of the precisely constructed high-speed linear motor of the invention herein.

SUMMARY OF THE INVENTION

It is the objective of the present invention to provide high speed linear motor (HSLM) with a precise positioning ability which is characterized in operating reliably and powerfully with high speed and acceleration, excellent positioning accuracy, minimum frictional loss, yet constructed in a compact size.

To achieve the aforementioned objective, the HSLM of the present invention comprises a stationary part and a moving part, wherein the moving part is formed of a ferromagnetic substance without any wire connection therein; while the stationary part is constructed of several field magnet modules whose windings are mutually connected so as to build up a magnetic field for operating the HSLM. It is a noteworthy feature of this structure that no worry of conductor disconnection when the moving part moves at high speed since there is no wire connected to it. For provision of a definite track for the moving part to attain a powerful driving force, the HSLM of the present invention is formed into a sandwiched structure. The stationary part is composed of an upper primary structure and a lower primary structure disposed at two sides of the moving part respectively. Both primary structures are constructed of several field magnet modules which are separated by a non-wearing bearing, such as an air bearing to support the moving part between the upper and the lower primary structures of the stationary part. With the field magnet modules at both sides of the moving part, the intensity of the magnetic field will be at least doubled compared to that of a conventional linear motor with the field magnet modules at one side only. The aforementioned objective is thus easily achieved by the HSLM of the present invention.

Finally, a position sensor for the HSLM, if installed, is equipped on the stationary part instead of on the moving part so as to prevent the interruption of signals from disconnection of the signal wires when the motor operates at high speed.

BRIEF DESCRIPTIONS OF THE DRAWINGS

The drawings disclose illustrative embodiments of the present invention, which serve to exemplify the various objects and advantages hereof, and are as follows.

DETAILED DESCRIPTIONS OF THE PREFERRED EMBODIMENT

Figure 1:
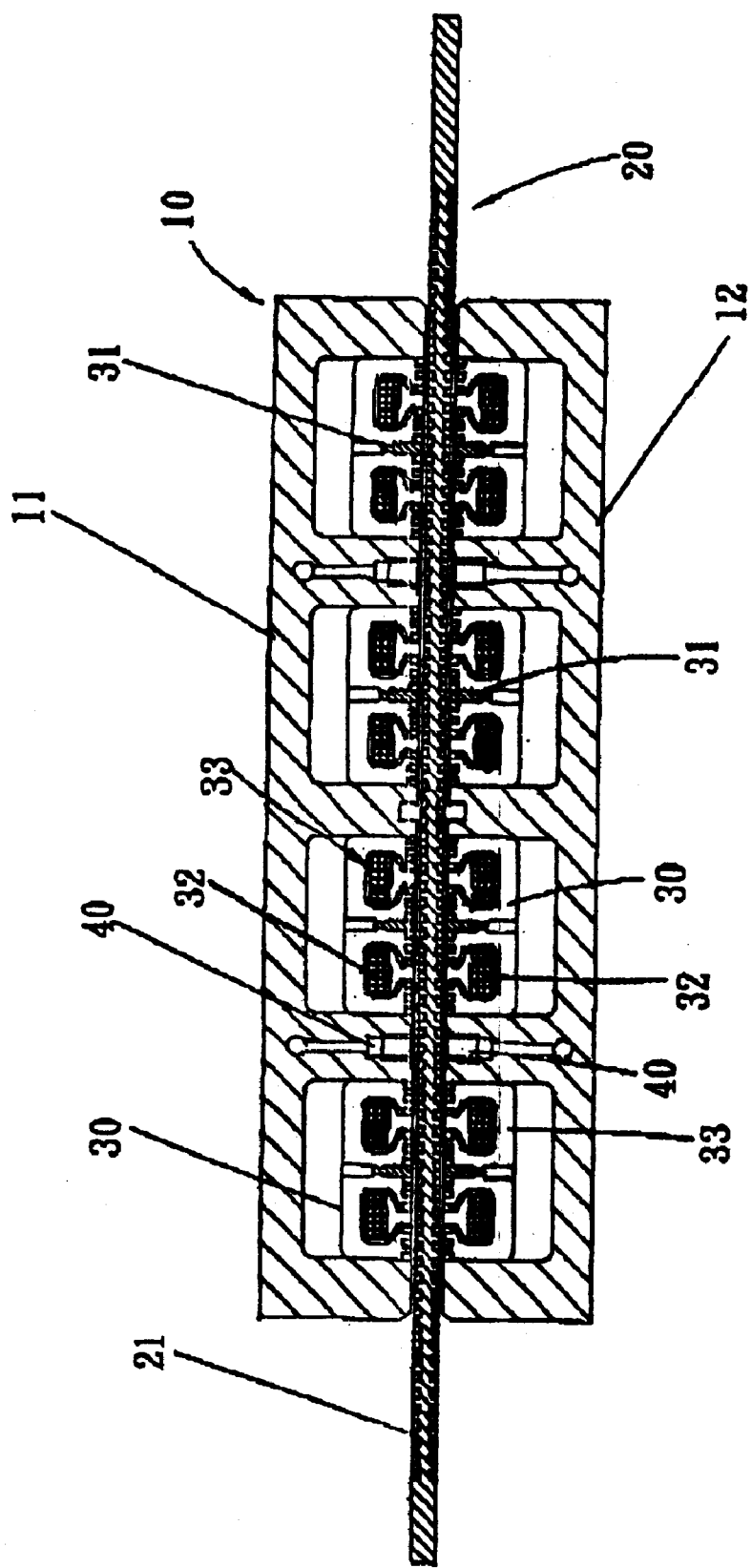
FIG. 1 is a cross sectional view of the single axis HSLM according to the present invention wherein the motor is operated in open loop control mode.

FIG. 1 shows the cross sectional view that the single axis HSLM of the present invention is operated in open loop control mode. It is shown in FIG. 1 that the HSLM of the present invention consists of a stationary part 10 and a moving part 20. The stationary part 10 of the motor is composed of an upper primary structure 11 and a lower primary structure 12 disposed at two sides of the moving part 20, namely, the moving part 20 is interposed between the upper and the lower primary structures (11 and 12) of the stationary part 10.

Each primary structure (11 or 12) consists of at least two field magnet modules 30 (four of them shown in this embodiment), where each field magnet module 30 further includes a permanent magnet 31, a laminated silicon steel sheet stack 32, and a coil 33; and a non-wearing bearing 40, which can be an air bearing, is fitted between any two adjacent field magnet modules 30. Meanwhile, the upper and the lower primary structures (11 and 12) are conjoined together.

The moving part 20, being constructed of a secondary structure 21, is made of a ferromagnetic substance in a serrated form. This serrated ferromagnetic structure can generate an advancing force from the magnetic fluxes built up by the field magnet modules 30. Also, the moving part 20, being formed into a thin plate, is so light that it can be supported by the non-wearing bearing 40 between the upper and the lower primary structures (11 and 12). Thus, the moving part 20 will make linear movement between the upper and the lower primary structures (11 and 12) as the secondary structure 21 generates force from the magnetic fluxes built up by the field magnet modules 30 of the stationary part 10. The moving part 20 therewith is able to position a work piece accurately for machining.

Figure 2:
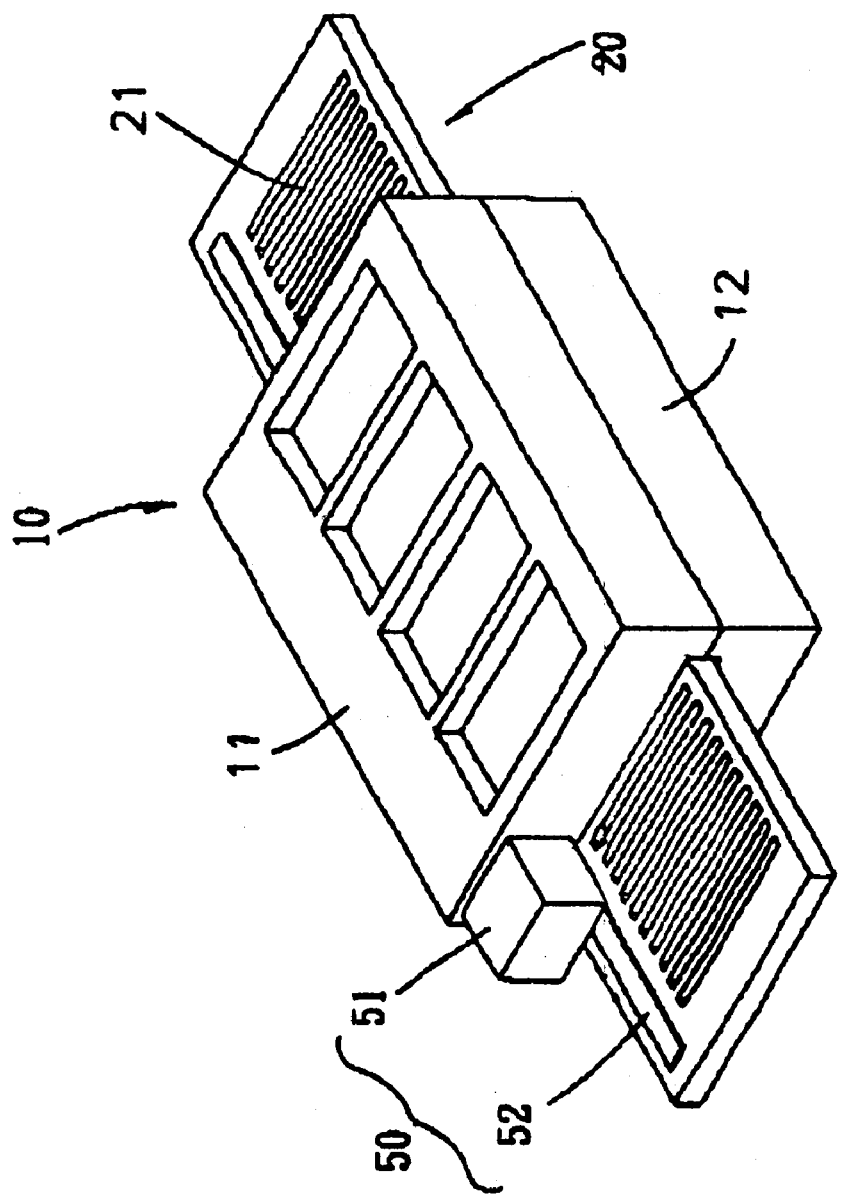
FIG. 2 is a schematic view of the single axis HSLM according to the present invention wherein the motor is operated in closed loop control mode.

FIG. 2 is a schematic view of the single axis HSLM of the present invention wherein the motor is operated in closed loop control mode. In this embodiment, a position sensor 50 is provided at a position straddling the upper primary structure 11 of the stationary part 10 and the moving part 20. The position sensor 50 includes a probe 51 equipped on the primary structure 11 and a measuring scale 52 laid on the moving part 20. With this arrangement, a signal of position information can be fed back in closed loop control mode so as to further improve the accuracy and avoid stall, which arises from the field magnet modules 30 failing to catch up with the rapid movement of the moving part 20. It should be noted that the probe 51 is equipped on the stationary part 10 so that there is no worry about failing to transmit the feed back signal owing to disconnection of the signal wires even when the motor operates at high speed.

Figure 3:
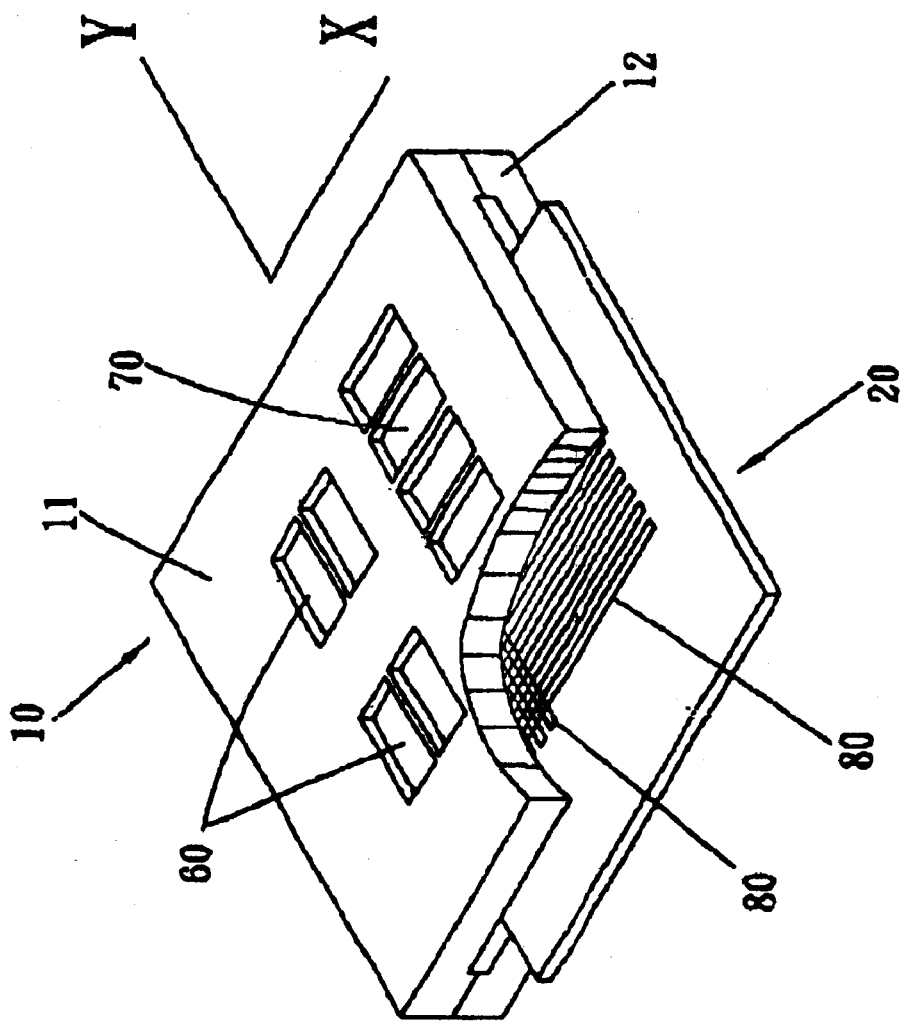
FIG. 3 is a schematic view of the dual axis HSLM according to the present invention wherein the motor is operated in open loop control mode.

FIG. 3 is a schematic view of the present invention wherein the dual axis motor is operated in open loop control mode. The moving part 20 is interposed between the upper primary structure 11 and the lower one 12 as in the single axis motor. This embodiment is characterized in that X axis driving field magnet modules 60 and Y axis driving field magnet modules 70 are provided for both the upper and the lower primary structures (11 and 12). The two driving field magnet modules 60 and 70 are perpendicular to each other. Corresponding to the X and Y axes driving field magnet modules (60 and 70) in the upper and the lower primary structures (11 and 12), the ferromagnetic substance of secondary structure 80, which constructs the moving part 20, is serrated in a cross-stitched form in these two directions, respectively. With this structure, the moving part 20 can move along both X and Y directions more precisely thereby upgrading the performance of the HSLM.

Figure 4:
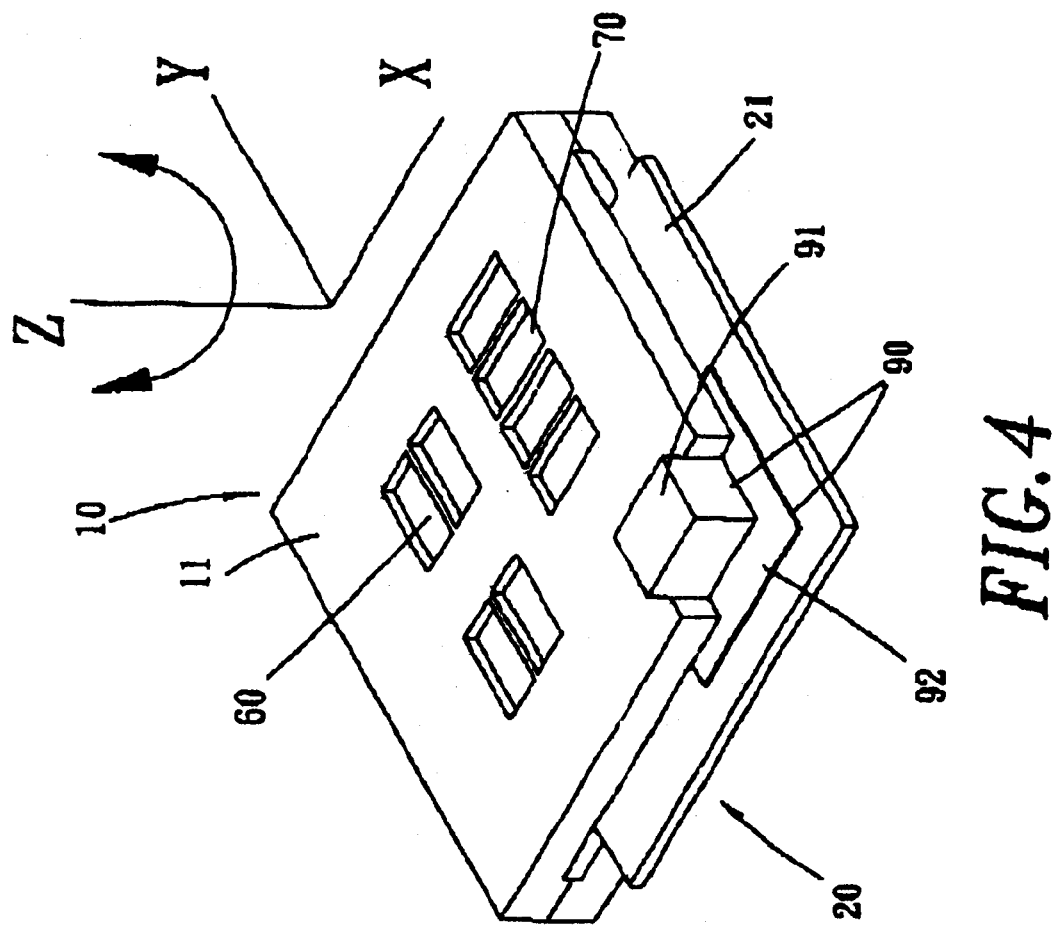
FIG. 4 is a schematic view of the dual axis HSLM according to the present invention wherein the motor is operated in closed loop control mode.

FIG. 4 is a schematic view of the present invention wherein the dual axis HSLM is operated in closed loop control mode. This embodiment is characterized in that an extra position sensor 90 is provided for the former embodiment shown in FIG. 3 between the stationary part 10 and moving part 20. The extra position sensor 90 consists of a probe 91 equipped on the upper primary structure 11 and a measurement plate 92 (two dimensional) laid on the moving part 20. With this arrangement, a signal of position information can be fed back in closed loop control mode so as to further improve the accuracy and avoid stall, which arises from the field magnet modules 30 failing to catch up with the rapid movement of the moving part 20. It should be noted that the probe 91 is equipped on the stationary part 10 so that there is no worry about failing to transmit the feed back signal owing to disconnection of the signal wires even when the motor operates at high speed.

After having finished reading over the above detailed descriptions of the present invention, one may clearly understand that the present invention has several features that are distinctly superior to any other conventional techniques as follows:

1. The moving part is supported between the upper and the lower primary structures by the non-wearing bearing, namely, the air bearing. The stationary part and the moving part never contact with each other, whether the motor is in operation or not, by reason that there is compressed air pervading in the non-wearing bearing. Accordingly, the HSLM of the present invention is free from frictional resistance and abrasion. In addition, the compressed air in the bearing has a cooling effect. Besides, the novel construction of the stationary part conjoined by an upper primary structure and a lower one intensifies the driving force of the motor at least twice that of a conventional one.

2. The unique construction by sandwiching the moving part between the stationary parts makes the motor size compact to save required installation space in the plant.

3. Compactness of the HSLM of the present invention has no worries about problem regarding stiffness and backlash as occurred in the conventional ball screw unit. The HSLM of the present invention is therefore able to keep excellent positioning accuracy and operate with no frictional loss.

4. There is no worry about failing to transmit the feed back signal owing to disconnection of the signal wires even at high speed because the signal is transmitted from the probe in the stationary part.

It is therefore understood that those who are skilled in the art will readily perceive how to modify the invention. Accordingly, the appended claims are to be construed to cover all equivalent structures that fall within the scope and spirit of the present invention.

What is claimed is:

1. A high speed linear motor (HSLM) with a precise positioning ability comprising:

a stationary part having an upper primary structure and a lower primary structure conjoined one with the other, each said primary structure including a plurality of field magnet modules, and each said field magnet module including a permanent magnet, a laminated silicon steel sheet stack, and a coil disposed therein; and a moving part including a secondary structure suspended in displaceable manner between said upper and lower primary structures of said stationary part for suspended displacement responsive thereto, said secondary structure being made of a ferromagnetic substance, at least a portion of said secondary structure having a serrated form;

said upper and said lower primary structures being disposed about said moving secondary part so as to substantially sandwich said moving secondary part therebetween.

2. The HSLM of claim 1, further comprising at least one non-wearing bearing is fitted between adjacent pairs of said field magnet modules so as to prevent direct contact of said stationary part with said moving part.

3. The HSLM of claim 2, wherein said non-wearing bearing is an air bearing.

4. The HSLM of claim 1, further comprising a position sensor coupled to at least one of said upper and lower primary structures of said stationary part and to said moving part, wherein a probe of said position sensor is disposed on said stationary part.

5. The HSLM of claim 1, wherein an X axis driving field magnet module and a Y axis driving field magnet module are provided for said upper and said lower primary structures, and said X axis and Y axis driving field magnet modules are perpendicularly oriented with respect to each other.

* * * * *